(12) United States Patent
Otsuka et al.

(10) Patent No.: US 8,433,011 B2
(45) Date of Patent: Apr. 30, 2013

(54) SIGNAL PROCESSING DEVICE, METHOD AND RECEIVING DEVICE

(75) Inventors: Keitaro Otsuka, Yokohama (JP); Takeshi Inoue, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 332 days.

(21) Appl. No.: 13/014,980

(22) Filed: Jan. 27, 2011

(65) Prior Publication Data

US 2011/0188610 A1 Aug. 4, 2011

(30) Foreign Application Priority Data

Jan. 29, 2010 (JP) ................................. 2010-017854

(51) Int. Cl.
*H03D 1/00* (2006.01)
(52) U.S. Cl.
USPC .......................................................... 375/343
(58) Field of Classification Search .................. 375/260, 375/316–317, 340, 342–343
See application file for complete search history.

(56) References Cited

U.S. PATENT DOCUMENTS

| | | | | |
|---|---|---|---|---|
| 4,583,048 A | * | 4/1986 | Gumacos et al. ............. | 329/302 |
| 6,310,856 B1 | * | 10/2001 | Taipale ......................... | 370/208 |
| 6,438,183 B1 | * | 8/2002 | Taura et al. ................... | 375/343 |
| 7,088,825 B2 | * | 8/2006 | Sambhwani et al. .......... | 380/268 |
| 7,813,456 B2 | | 10/2010 | Chen et al. | |
| 2002/0037028 A1 | * | 3/2002 | Baltersee et al. ............. | 375/148 |
| 2006/0088133 A1 | | 4/2006 | Chen et al. | |
| 2006/0093076 A1 | * | 5/2006 | Lee et al. ...................... | 375/343 |

FOREIGN PATENT DOCUMENTS

| | | |
|---|---|---|
| JP | 2001-223668 A | 8/2001 |
| JP | 2002-152172 A | 5/2002 |
| JP | 2006-148884 A | 6/2006 |

* cited by examiner

*Primary Examiner* — Khanh C Tran
(74) *Attorney, Agent, or Firm* — Fujitsu Patent Center

(57) ABSTRACT

A signal processing device includes: a first correlator that sequentially multiplies a first receive signal including a pattern in a receive signal and a first reference pattern signal including a complex conjugate of a first partial signal of the first receive signal at a sampling timing to generate a first correlation voltage; a second correlator that sequentially multiplies the first receive signal and a second reference pattern signal including a complex conjugate of a second partial signal, which is behind the first partial signal, at a sampling timing to generate a second correlation voltage; and a phase difference generation circuit that generates a first phase difference between the first partial signal and the second partial signal based on a first correlation peak voltage obtained when the first correlation voltage has a peak value and a second correlation peak voltage obtained when the second correlation voltage has a peak value.

15 Claims, 12 Drawing Sheets

US 8,433,011 B2

SIGNAL PROCESSING DEVICE, METHOD AND RECEIVING DEVICE

CROSS-REFERENCE TO RELATED APPLICATIONS

This application claims the benefit of priority from Japanese Patent Application No. 2010-17854 filed on Jan. 29, 2010, the entire contents of which are incorporated herein by reference.

BACKGROUND

1. Field

Embodiments discussed herein relate to a signal processing device, a signal processing method, and a receiving device.

2. Description of Related Art

In Orthogonal Frequency Division Multiplexing system (OFDM system), bit strings in symbol basis are modulated to a plurality of sub-carrier signals having frequencies which are orthogonal to one another and the sub-carrier signals are inverse-fast-Fourier-transformed (IFFT transformed) and are output as an OFDM signal. A guard interval is added into each symbol of the OFDM signal for multi-path phasing.

Related art is disclosed, for example, in Japanese Laid-open Patent Publication No. 2006-148884, Japanese Laid-open Patent Publication No. 2002-152172, Japanese Laid-open Patent Publication No. 2001-223668 and the like.

SUMMARY

According to one aspect of the embodiments, a signal processing device includes: a first correlator that sequentially multiplies a first receive signal including a pattern in a receive signal and a first reference pattern signal including a complex conjugate of a first partial signal of the first receive signal at first a sampling timing to generate a first correlation voltage; a second correlator that sequentially multiplies the first receive signal and a second reference pattern signal including a complex conjugate of a second partial signal, which is behind the first partial signal, at a second sampling timing to generate a second correlation voltage; and a phase difference generation circuit that generates a first phase difference between the first partial signal and the second partial signal based on a first correlation peak voltage obtained when the first correlation voltage has a first peak value and a second correlation peak voltage obtained when the second correlation voltage has a second peak value.

The object and advantages of the invention will be realized and attained by means of at least the feature, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

In the OFDM system, symbol synchronization and frequency synchronization are performed.

In the frequency synchronization, in order to match communication frequencies of a source and a sink with each other, a phase rotation amount corresponding to a frequency deviation is detected on the sink side and a local frequency of the sink is controlled so as to reduce the phase rotation amount.

For example, in the OFDM system, data is modulated to a plurality of sub-carrier signals having frequencies which are orthogonal to one another. Automatic frequency control in which the frequency of the sink is synchronized with the frequency of the source based on a symbol of receive signal may be performed by utilizing a known pattern in a symbol of transmit signal which has been IFFT transformed.

Figure 1:
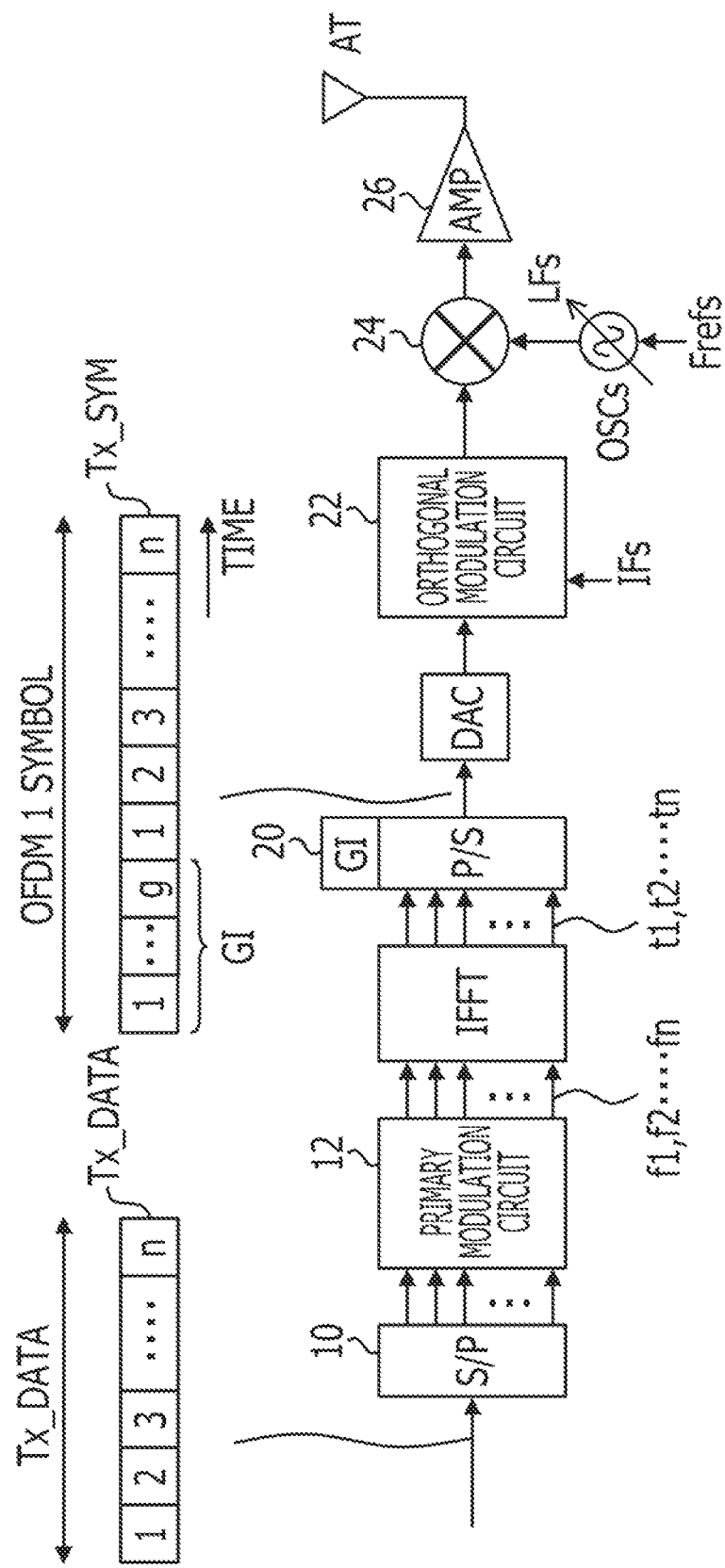
FIG. 1 illustrates an exemplary transmitting device.

FIG. 1 illustrates an exemplary transmitting device. Transmit data Tx_Data may have a serial pattern including, for example, known n-bit data. A front-stage circuit (not illustrated) may correct an error of the n-bit data. The transmit data Tx_Data is converted to n parallel data using a serial-parallel conversion circuit 10. A primary modulation circuit 12 modulates the parallel data with a modulation system e.g. a Quadrature Phase Shift Keying (QPSK) system to generate sub-carrier signals having frequencies f1 to fn which are orthogonal to one another. An inverse fast Fourier transform section IFFT allocates the sub-carrier signals having the frequencies f1 to fn to times t1 to tn on the time axis. A parallel-serial conversion circuit 20 adds the trailing end part of a sub-carrier signal group to the leading end part of the group as a guard interval GI and performs parallel-to-serial conversion on the sub-carrier signals. One symbol transmit signal Tx_sym may be output from the parallel-serial conversion circuit 20 and may include the guard interval GI at the leading end part and the sub-carrier signals which corresponds to the modulated transmit data Tx_Data at the trailing end part.

The one symbol transmit signal Tx_sym is converted to an analog signal by a digital-analog conversion circuit DAC. The analog signal is orthogonal-modulated with an intermediate frequency clock IFs by an orthogonal modulation circuit 22, is up-converted with a local frequency clock LFs by a mixer 24, and is output from an antenna AT to a communication medium via an output amplifier 26. The local frequency clock LFs may be generated by an oscillator OSCs based on a reference frequency clock Frefs.

Figure 2:
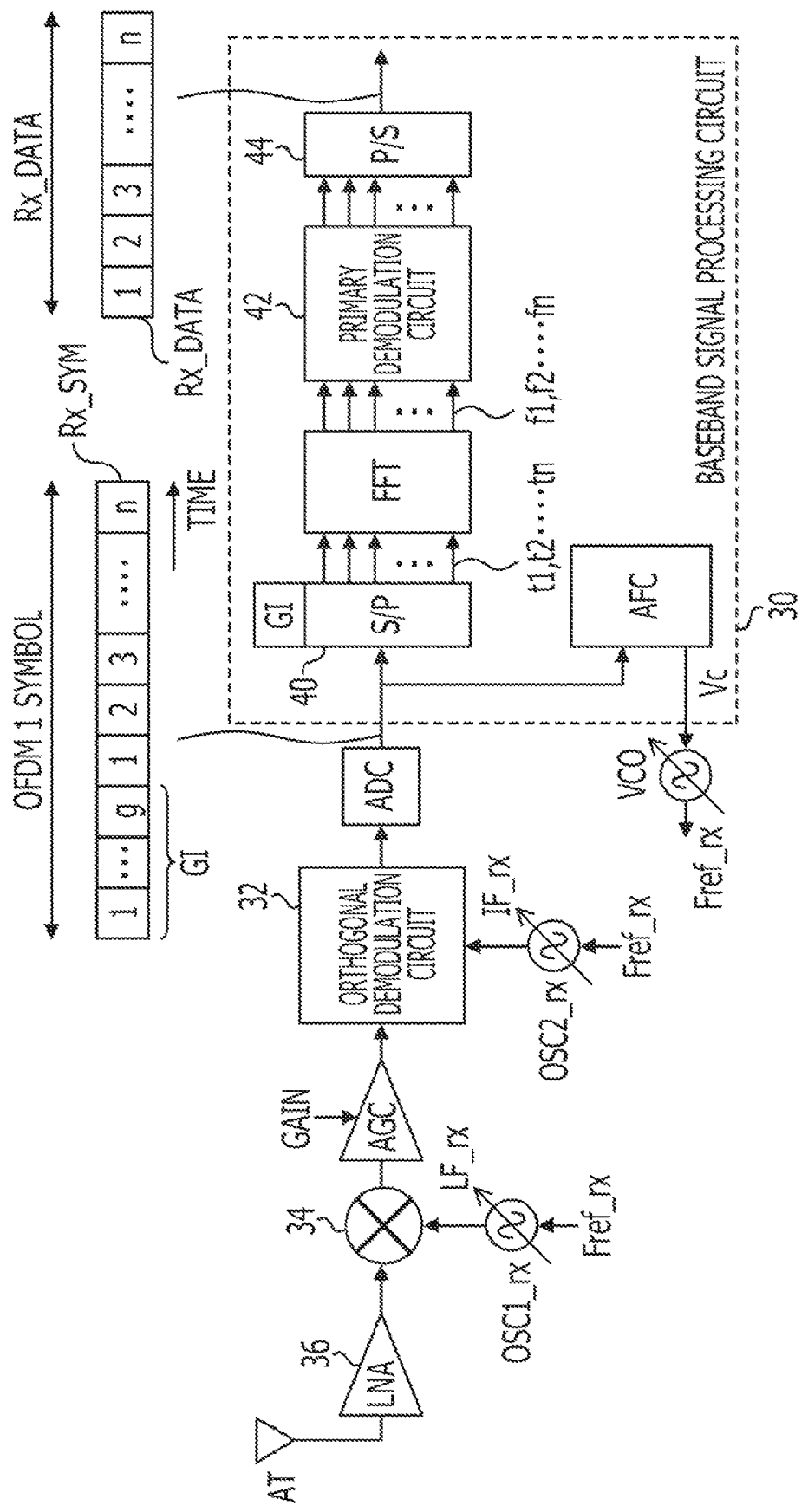
FIG. 2 illustrates an exemplary receiving device.

FIG. 2 illustrates an exemplary receiving device. The receiving device demodulates a OFDM-modulated receive signal using a process which is reverse to a process for the transmitting device. For example, the receive signal received at the antenna AT is amplified by a low-noise amplifier 36, is down-converted with a local frequency clock LF_rx on the sink side by a mixer 34, is amplified by an automatic gain amplifier AGC and is orthogonal-demodulated with an intermediate frequency clock IF_rx by an orthogonal demodulation circuit 32. I-channel and Q-channel signals are output from the orthogonal demodulation circuit 32. The orthogonal-demodulated receive signal is analog-to-digital converted by an analog-digital conversion circuit ADC and the digital signal is supplied to a baseband signal process circuit 30.

A serial-parallel conversion circuit 40 included in the baseband signal process circuit 30 processes the I-channel and Q-channel digital signals, for example, removes the guard interval GI from one symbol receive signal Rx_sym which is serial on the time axis and serial-to-parallel converts the one symbol receive signal Rx_sym. The parallel signal is transformed by a fast Fourier transform circuit FFT. The parallel signal of the times t1 to tn on the time axis are transformed to sub-carrier signals of the frequencies f1 to fn on the frequency axis. The sub-carrier signal is demodulated by a primary demodulation circuit 42 and the demodulated signal is converted to serial receive data Rx_Data by a parallel-serial conversion circuit 44.

The baseband signal process circuit 30 includes an automatic frequency control circuit AFC. The automatic frequency control circuit AFC detects a phase rotation amount corresponding to a frequency deviation between the transmitting device and the receiving device based on an known pattern receive signal in the one-symbol OFDM receive signal Rx_sym, which is output from the analog-digital conversion circuit ADC, and controls a control voltage Vc of a voltage control oscillator VCO for generating a reference clock Fref_rx of the receiving device. The automatic frequency control circuit AFC controls the control voltage Vc so as to reduce the phase rotation amount to a certain value, for example, zero and controls such that the frequency of the receiving device matches the frequency of the transmitting device, for example, a frequency deviation between the receiving device and the transmitting device is reduced.

The reference clock Fref_rx is input into oscillators OSC1_rx and OSC2_rx and the oscillators generate the reference clock LF_rx and the intermediate frequency clock IF_rx. The frequency of the reference clock Fref_rx may be controlled to set the deviation in frequency between the receiving device and the transmitting device to a certain value, for example, zero.

Figure 3:
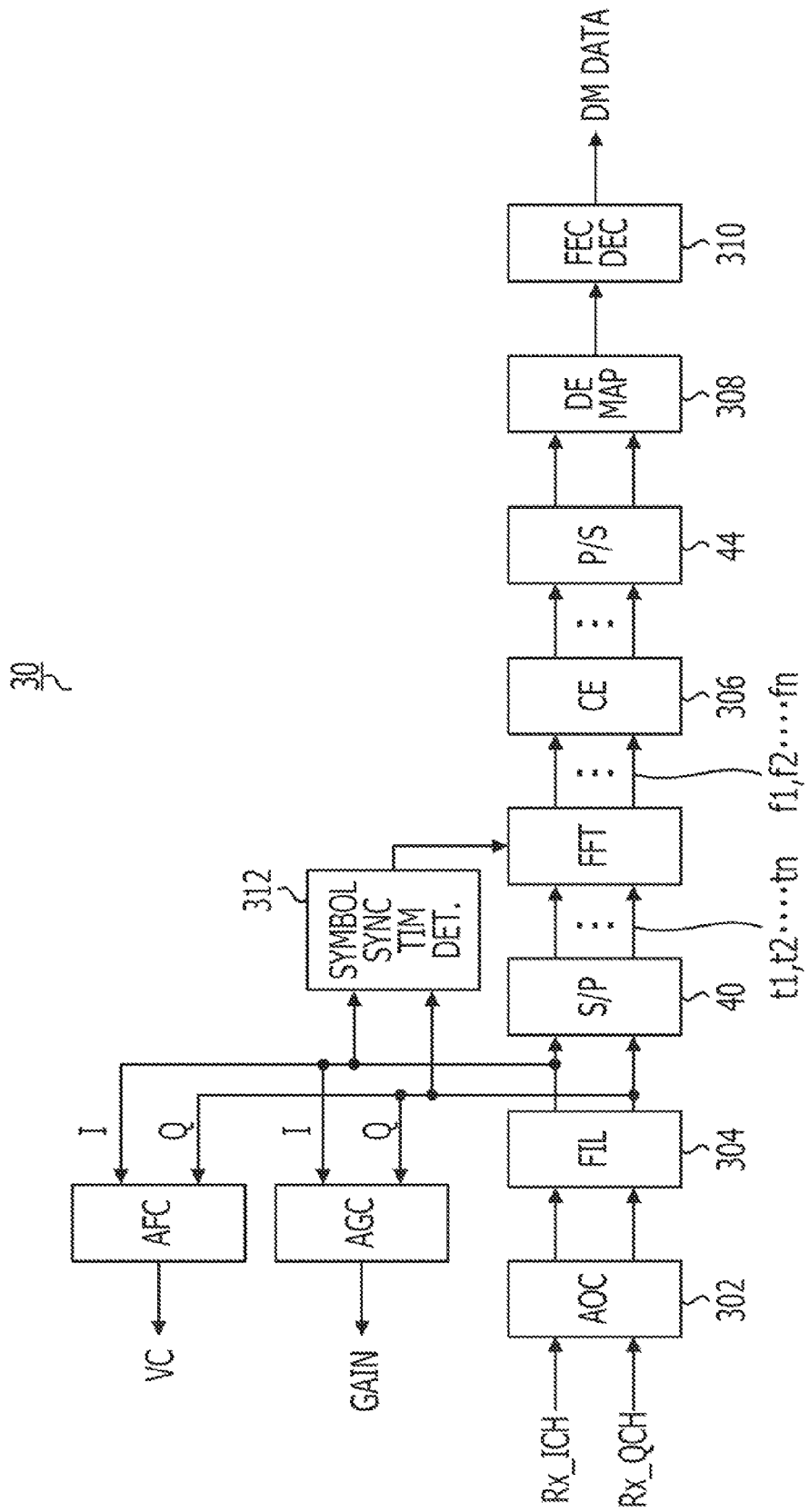
FIG. 3 illustrates an exemplary a baseband signal processing circuit.

FIG. 3 illustrates an exemplary baseband signal process circuit. The baseband signal process circuit 30 includes an automatic offset calibration (AOC) circuit 302. The automatic offset calibration (AOC) circuit 302 corrects offset voltages of the input I-channel and Q-channel digital baseband signals regarding a reference voltage of the analog-digital conversion circuit ADC. A filter circuit 304 performs bandwidth control process on each of the I-channel and Q-channel signals after the offset voltages is corrected by the automatic offset calibration circuit 302. An output from the filter circuit 304 are supplied to the automatic frequency control circuit AFC, the automatic gain control circuit AGC and a symbol synchronization timing detection circuit 312.

The automatic frequency control circuit AFC generates the control voltage Vc of the voltage control oscillator VCO for generating the reference frequency clock Fref_rx illustrated in FIG. 2, in order to identify a frequency deviation or a stability-dependent carrier frequency offset between a oscillator on the source side and a oscillator the sink side and to adjust the frequency on the sink side to the frequency on the source side. The automatic frequency control circuit AFC adjusts the gain of the automatic gain amplifier AGC illustrated in FIG. 2 such that the amplitude of the digital baseband signal becomes a desired value. The automatic frequency control circuit AFC makes the dynamic range of the analog-digital conversion circuit ADC effective after an orthogonal wave detection of the orthogonal demodulation circuit 32 and then.

The symbol synchronization timing detection circuit 312 detects the timing during one symbol period of the OFDM and notifies the fast Fourier transform circuit FFT of the timing. For example, the symbol synchronization timing detection circuit 312 detects the timing at which the power of the correlation voltage between the guard interval GI at the leading end part of the one-symbol receive signal and a copy part at the trailing end part thereof has a peak value. The fast Fourier transform circuit FFT performs fast Fourier transform process on the receive signal during the one-symbol period. The fast-Fourier-transformed receive signal is then demodulated by a demodulation circuit in the fast Fourier transform circuit FFT such as, for example, the primary demodulation circuit illustrated in FIG. 2.

A channel estimation (CE) circuit 306 extracts a pilot from the one-symbol signal, which is demodulated by fast Fourier transform process and estimates a state of a transmission line of a channel by performing moving average process. Synchronous detection is performed on a signal of each channel by feed forward control based on the signal indicating the channel transmission line state.

A de-mapping circuit 308 extracts communication data from the demodulated data in the I-channel and Q-channel signals, which are parallel-to-serial converted by the parallel-serial conversion circuit 44, and outputs the communication data to an error correction decoding circuit 310. The error correction decoding circuit 310 decodes the signal which is encoded and error-corrected on the source side. In the OFDM system, the signal is encoded and error-corrected on the source side, is a redundancy bit is added to an information bit thereof, and the signal with the redundancy bit is transmitted to the transmission line. Then, the signal is decoded and an error which is generated in the transmission line is corrected on the sink side. Convolution encoding is performed on the signal on the source side as FEC (Forward Error Correction) and the error is corrected by Viterbi decoding on the sink side. Then, demodulated data DMdata is output.

Figure 4:
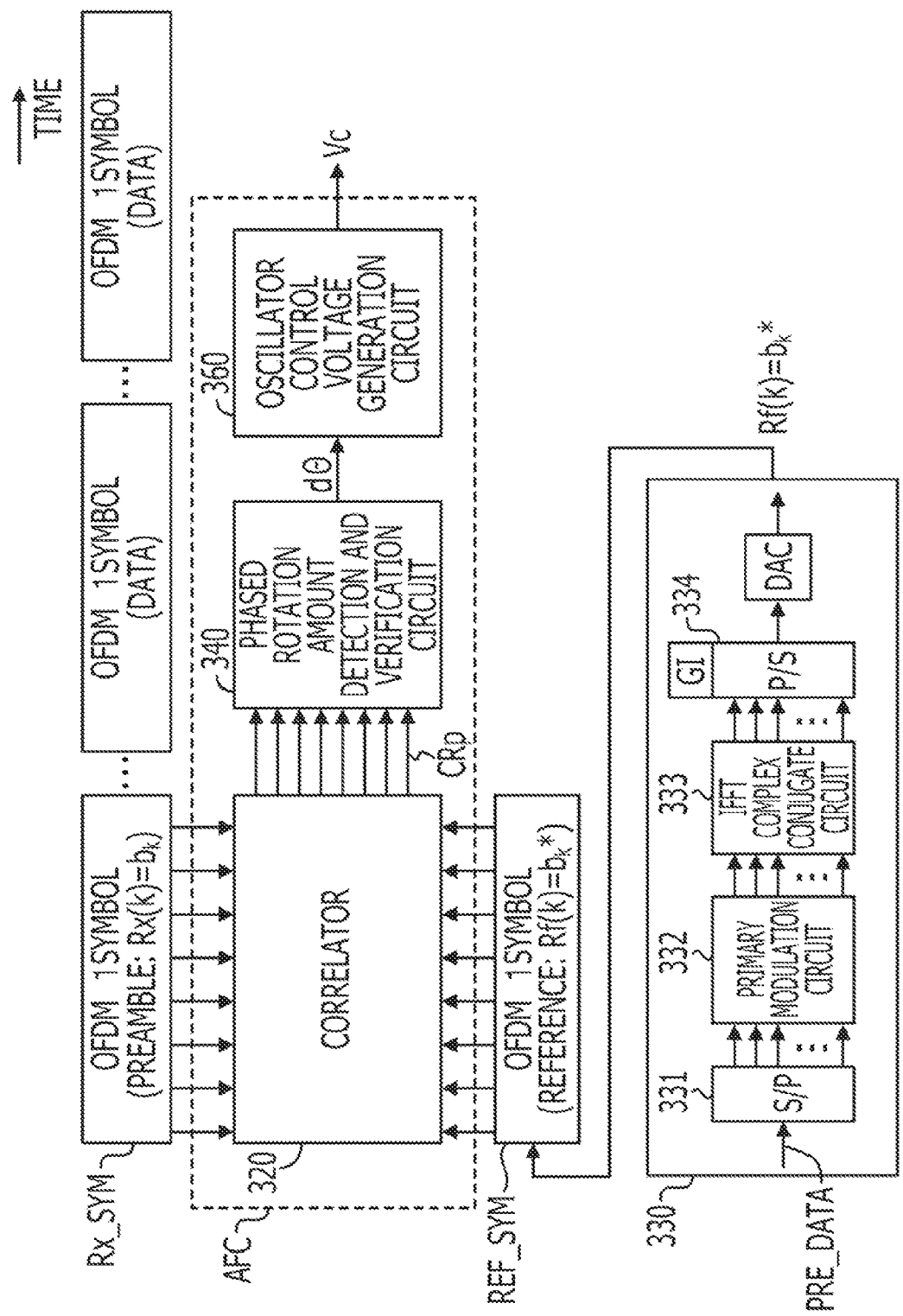
FIG. 4 illustrates an exemplary automatic frequency control circuit.

FIG. 4 illustrates an exemplary automatic frequency control circuit. The automatic frequency control circuit AFC includes a correlator 320, a phase rotation amount detection and verification circuit 340 for detecting a phase rotation amount dθ from an output from the correlator, and an oscillator control voltage generation circuit 360 for generating the control voltage Vc used to control the oscillator based on the phase rotation amount dθ so detected.

In FIG. 4, as the OFDM one-symbol receive signal Rx_sym, a preamble symbol and a plurality of data symbols, which follows the preamble symbol, are illustrated. In the OFDM communication system, a frame includes the preamble symbol including a known pattern data string and the data symbols including transmit data strings. An OFDM type one-symbol reference pattern signal is generated based on preamble data Pre_Data including the known pattern data on the sink side, and a plurality of partial signals included in the known pattern receive signal in the preamble and the reference pattern signal are correlated with each other. A correlation voltage between the plurality of partial signals in one simple of the known pattern receive signal and the reference pattern signal is monitored and the phase difference dθ is detected based on a correlation peak voltage signal CRp obtained when the correlation voltage has a peak value.

For example, the correlator 320 correlates each of eight partial signals obtained by dividing the OFDM type known pattern receive signal Rx_sym in one symbol into eight parts with the reference signal Ref_sym to output the correlation peak voltage signal CRp obtained when the power value of the correlation voltage reaches a peak value. Phase information on each partial signal is included in the correlation peak voltage signal CRp. The phase information may not be absolute phase information. The phase rotation amount, for example, the phase difference between the partial signals is detected from the phase information on different partial signals. The phase rotation amount detection and verification circuit 340 obtains the phase rotation amount between different partial signals based on the correlation peak voltage signal CRp between the different partial signals by performing a certain arithmetic operation and verifies whether the phase rotation amount detected from the plurality of phase rotation amounts is correct or not.

In a reference pattern signal generation circuit 330, a serial-parallel conversion circuit 331 serial-to-parallel converts the preamble data Pre_Data of one symbol. A primary modulation circuit 332 modulates the serial-to-paralleled data. An IFFT (inverse fast Fourier transform) process section 333 inverse-Fourier-transforms the sub-carrier signal on the frequency axis of the modulated data to the sub-carrier signal on the time axis so as to serve as a complex conjugate of the sub-carrier signal. A parallel-serial conversion circuit 334 converts the signal to a serial signal and adds the guard interval to the leading end part thereof, and a digital-analog conversion circuit DAC digital-to-analog converts the serial signal. A reference pattern signal $Rf(k)=b_k^*$ may correspond to a signal serving as a complex conjugate of an known pattern receive signal $Rx(k)=b_k$.

The correlator 320 multiplies the known pattern receive signal $Rx(k)=b_k$ of the received preamble data Pre_Data and the reference pattern signal $Rf(k)=b_k^*$, which is generated on the sink side, to generate the correlation voltage.

Figure 5:
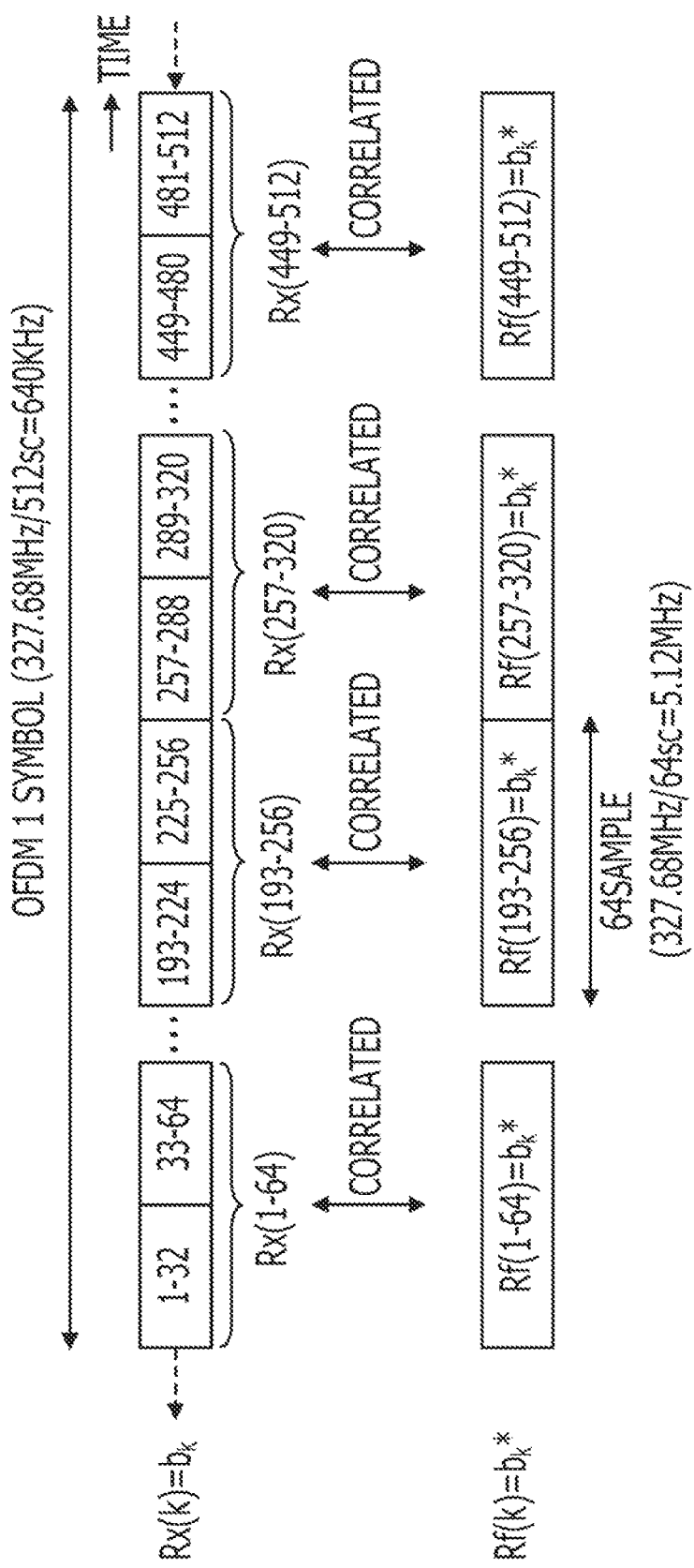
FIG. 5 illustrates an exemplary operation of a correlator.

FIG. 5 illustrates an exemplary operation of a correlator. The one-symbol existing pattern receive signal Rx(k) including 512 sub-carrier signals is divided into eight partial signals respectively including 1-st to 64-th sub-carrier signals, 65-th to 128-th sub-carrier signals, 129-th to 192-nd sub-carrier signals, 193-rd to 256-th sub-carrier signals, 257-th to 320-th sub-carrier signals, 321-st to 384-th sub-carrier signals, 385-th to 448-th sub-carrier signals, and 449-th to 512-th sub-carrier signals. Each partial signal includes 64 sub-carrier signals. A correlation value between each of the eight partial signals of the known pattern signal Rx(k) and each of corresponding eight signals obtained by dividing the reference pattern signal Rf(k) into eight parts is calculated.

Figure 6:
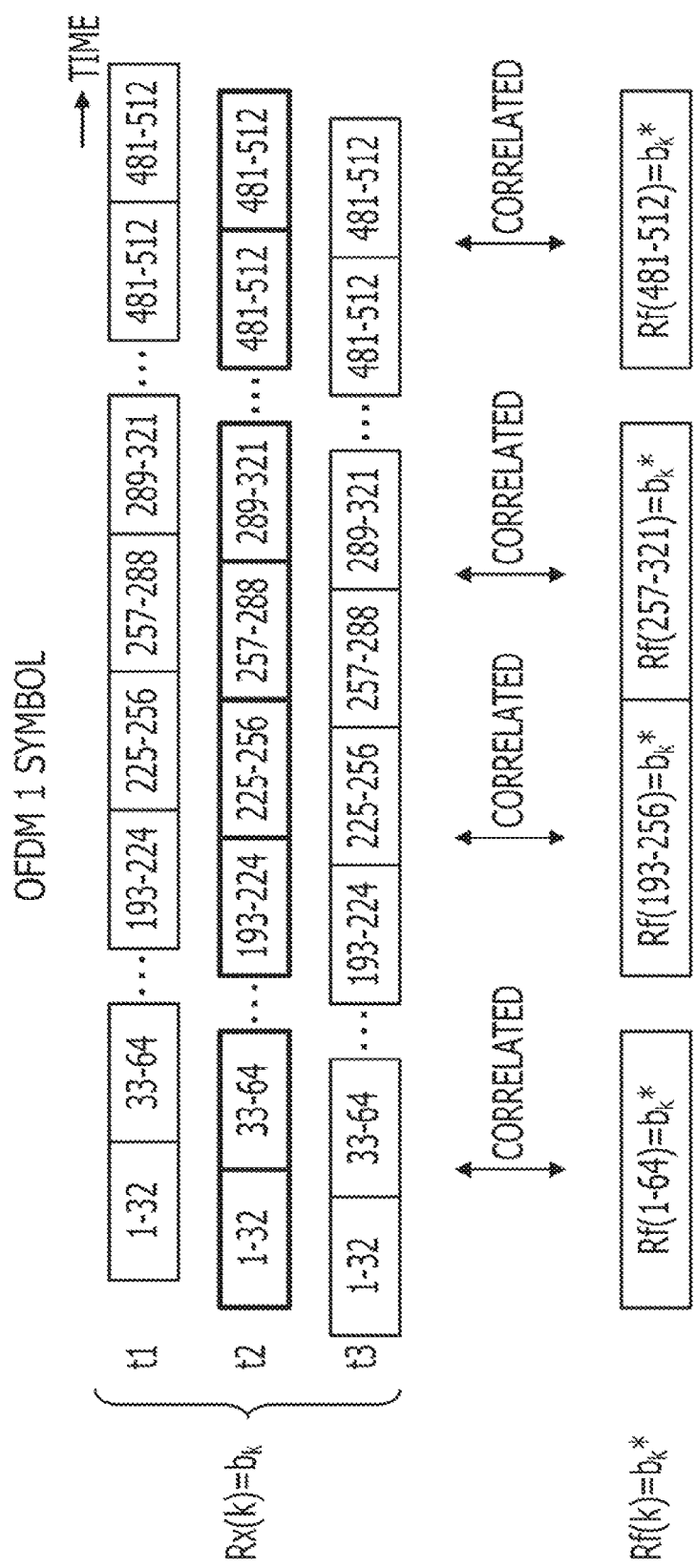
FIG. 6 illustrates an exemplary operation of a correlator.

FIG. 6 illustrates an exemplary operation of a correlator. The known pattern receive signal Rx(k) is input, for example, from the left side toward the right side in FIG. 6. The known pattern receive signal Rx(k) is input into the correlator at the times t1, t2 and then t3.

The correlation value, for example, the correlation voltage value is obtained by multiplying the signals Rx(k) and Rf(k) at 64 sampling points of each partial signal and adding the multiplied values together. The known pattern receive signal $Rx(k)=b_k$ and the reference pattern signal $Rf(k)=b_k^*$ are in a mutually complex-conjugated relation. Thus, when Rx(k) =a+bi and Rf(k)=a−bi, the multiplied value obtained at the time t2 when the known pattern receive signal Rx(k) is in synchronization with the reference pattern signal Rf(k) includes $Rx(k) \times Rf(k) = a^2 + b^2$ and a real number. The multiplied value obtained at each of the times t1 and t3 when these signals are out of synchronization with each other includes a real number and an imaginary number. The correlation value calculated at the timing when these signals are in synchronization with each other may be a peak value.

When a frequency deviation occurs due to mismatch between the frequency of the sink and the frequency of the source, the correlation value includes the known pattern receive signal Rx(k)=c+di and the reference pattern receive signal Rf(k)=a−bi. The multiplied value of these signals corresponds to $Rx(k) \times Rf(k) = (ac+bd)+(ad-bc)i$ and includes a phase component of the known pattern receive signal. The phase rotation amount between different partial signals is obtained by comparing the correlation values of different partial signals in one symbol with each other. For example, when the correlation values of different partial signals are a+bi and c+di, x+yi corresponding to the phase rotation amount (the phase difference) is expressed as follows.

$$x+yi=(ac+bd)+(ad-bc)i \qquad (1)$$

The angle information of a vector may be the phase rotation amount (the phase difference).

Figure 7:
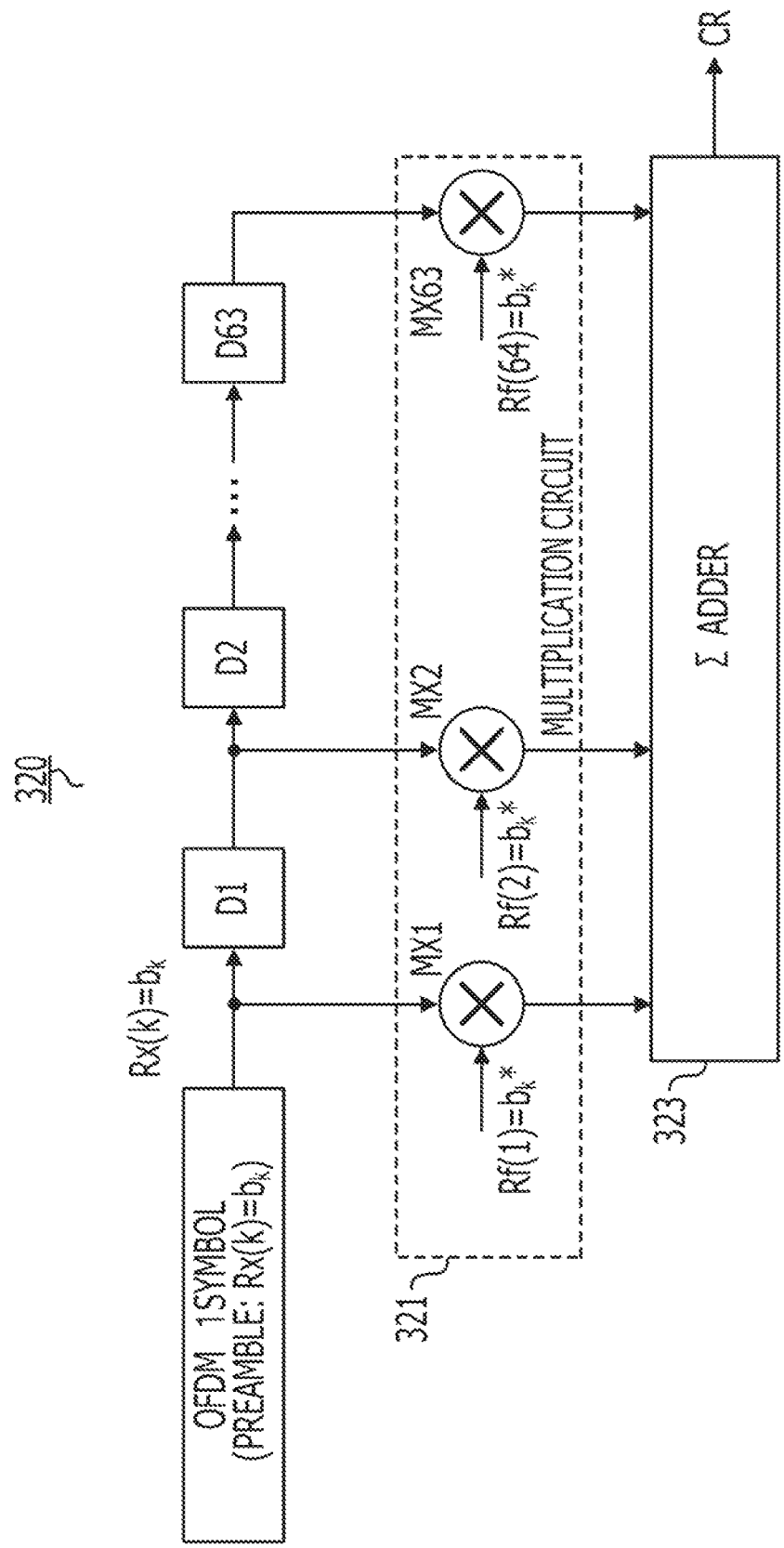
FIG. 7 illustrates an exemplary correlator.

FIG. 7 illustrates an exemplary correlator. The correlator 320 may calculate the correlation values of one partial signal. Since 64 sub-carrier signals are included in one partial signal, the number of sampling points may be 64. The correlator 320 multiples the signal at each of the 64 sampling points of the known pattern receive signal Rx(k) and the signal at each of the 64 sampling points of the reference signal and adds the multiplied values together. The correlator 320 includes 63 delay circuits D1 to D63 that delay the known pattern receive signal Rx(k), which is sequentially input, in synchronization with a clock (not illustrated), a multiplication circuit 321 that includes 64 multipliers MX1 to MX64, each of which multiplies the known pattern receive signal Rx(k) and the reference pattern signal Rf(k) at each of the 64 sampling points, and a Σ adder 323 that adds 64 results of multiplication together. An output from the adder may be the correlation value CR, for example, the correlation voltage value and may include a real number component and an imaginary number component. Arithmetic operation may be performed at a sample timing which is in synchronization with the clock.

When the known pattern receive signal Rx(k) is in synchronization with the reference pattern receive signal Rf(k) as illustrated in FIG. 6, the correlation value CR may include a real number component and the correlation power may become a peak value. The correlator calculates the correlation power. The correlator includes a power arithmetic circuit and a peak detection circuit, which outputs the correlation peak voltage CRp obtained when the correlation power is a peak value, and a buffer for buffering the correlation value CR in response to a detection of the peak value.

As illustrated in FIG. 5, the correlation peak voltage may be detected for each of the eight-divided partial signals in one symbol. The number of sub-carrier signals in one symbol may be 512. The cycle of one symbol of the OFDM may be (1/640 KHz) sec. The cycle of one sub-carrier signal may be (1/640× 512) sec. The frequency of one sub-carrier signal may be 640 KHz×512=327.68 MHz. Since each partial signal includes 64 sub-carrier signals, the cycle of each of eight-divided partial signals may be (1/640×512)×64 sec and the frequency thereof may be 640 KHz×512/64=5.12 MHz. Since one symbol is divided into eight sections, the detection cycle of the correlation peak voltage may be (1/640×8)=(1/5.12 MHz) sec, for example, ⅛ the cycle of one symbol. The correlation peak voltage is detected in a cycle which is shorter than that of one symbol.

Since the detection cycle of the correlation peak voltage is (1/5.12 MHz) sec, whether the phase rotation is clockwise or counterclockwise may be detected when the phase rotation amount of the adjacent partial signals is not more than ±π. For example, a frequency deviation which is within 2.56 MHz corresponding to one-half of the detection frequency 5.12 MHz of the correlation peak voltage may be eliminated.

In the OFDM communication system, when the phase rotation amount based on the correlation voltage between the guard interval GI and a copied part in one symbol is obtained, the detection cycle of the phase rotation amount may be (1/640 KHz) sec and the frequency deviation may be a frequency deviation when 320 KHz, which corresponds to one-half of the detection frequency 640 KHz, may be eliminated. In the high-frequency OFDM communication system, when an error in frequency is increased, the frequency deviation is reduced, so that the accuracy in frequency synchronization may be increased.

The reference pattern signal Rf(k) on the sink side may be a complex conjugate of the known pattern Pre_Data on the frequency axis which is fast Fourier transformed. For example, the known pattern signal Rx(k) and the reference pattern signal Rf(k) may be expressed by the following formula.

$$Rx(k)=b_k=\Sigma a_n e^{j(2\pi nk/N)}(n-0-(N-1)) Rf(k)=b_k^*$$

In the formula, $a_n$ corresponds to the known pattern signal Pre_Data in the preamble and $e^{j(2\pi nk/N)}$ corresponds to the sub-carrier signal.

Figure 8:
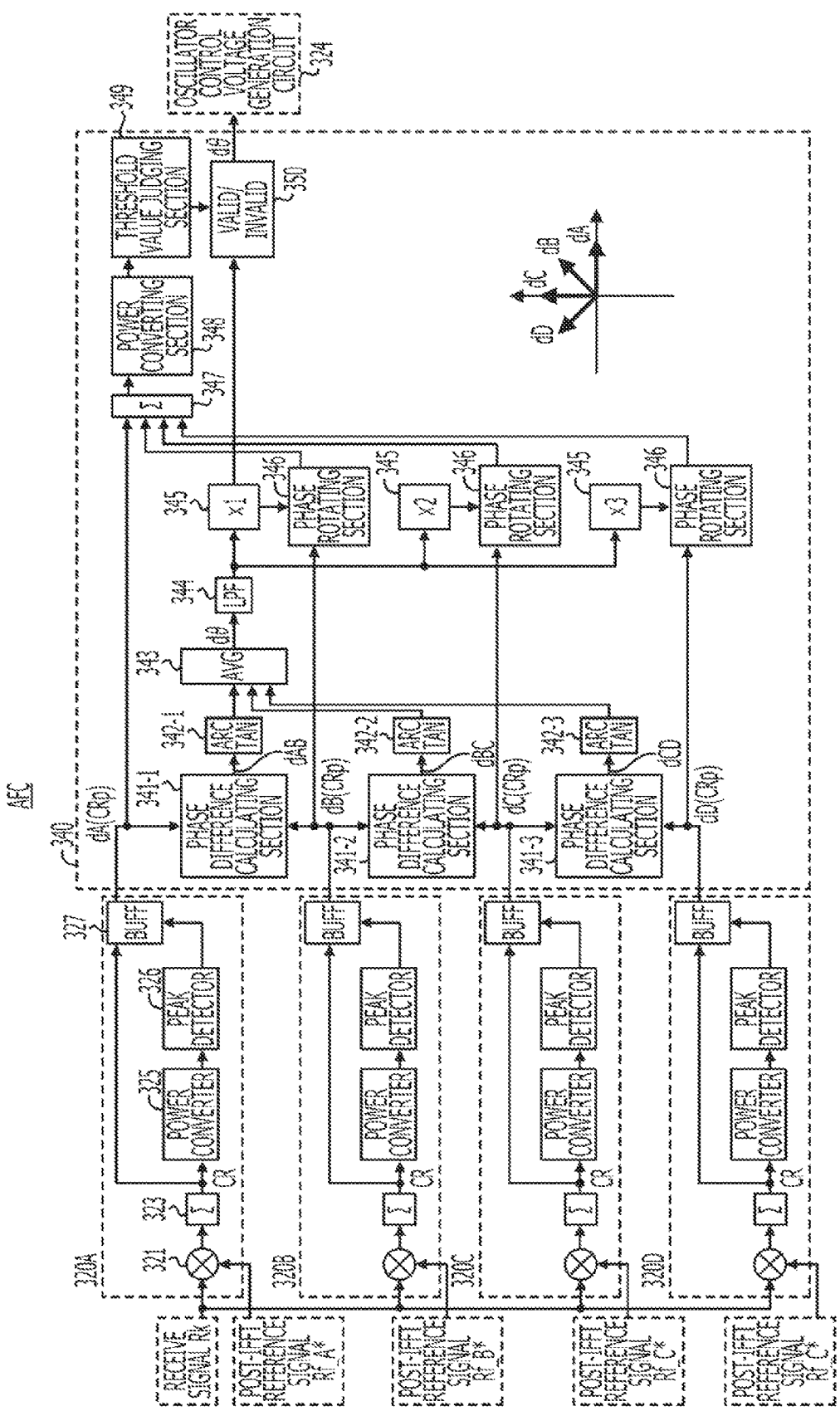
FIG. 8 illustrates an exemplary automatic frequency control circuit.

FIG. 8 illustrates an exemplary automatic frequency control circuit. The automatic frequency control circuit obtains correlation values with respect to, for example, four successive partial signals Rf_A* to Rf_D* included in eight partial signals illustrated in FIG. 5 to obtain the phase rotation amount (the phase difference) between partial signals. The correlation values may be obtained with respect to eight partial signals. For example, the phase rotation amount between partial signals may be obtained by obtaining the correlation values with respect to two or more partial signals.

A first correlator 320A accepts the receive signal Rx and obtains a correlation value between the receive signal Rx and a reference signal Rf_A* at a sampling timing. The receive signal Rx and the reference signal Rf_A* may be complex signals respectively including I-channel signals (real numbers) and Q-channel signals (imaginary numbers). For example, as illustrated in FIG. 8, the first correlator 320A includes the multiplication circuit 321 that multiplies the receive signal Rx and the reference signal Rf_A* at each of 64 sampling points, and the adder 323 that adds the multiplied values obtained at 64 sampling points together and outputs the correlation value (the correlation voltage value) CR. The first correlator 320A also includes a power converter 325, a peak detector 326, and a buffer 327 in order to detect a timing when the input receive signal Rx is synchronized with the reference signal Rf_A* corresponding to a partial signal of one symbol. The power converter 325 converts the correlation value CK to a power value. The peak detector 326 detects a timing when the power value reaches a peak value. The buffer 327 stores the correlation value CR obtained when the peak detector 326 detects the peak value of the power as the correlation peak voltage CRp.

As illustrated in FIG. 6, the correlation value CR between the receive signal Rx to be input and the reference signal Rf_A* corresponding to a partial signal is calculated at a certain sampling timing. When the receive signal Rx is in synchronization with the reference signal Rf_A*, the power of the correlation value CR may have a peak value. For example, as illustrated in a phase graph on a lower right part in FIG. 8, phase information dA of the partial signals of the receive signal Rx is included in the correlation peak voltage CRp obtained when the signals are in synchronization with each other. In FIG. 8, for example, the phase information dA of the first partial signal may include a real part and the phase may be zero.

Figure 9:
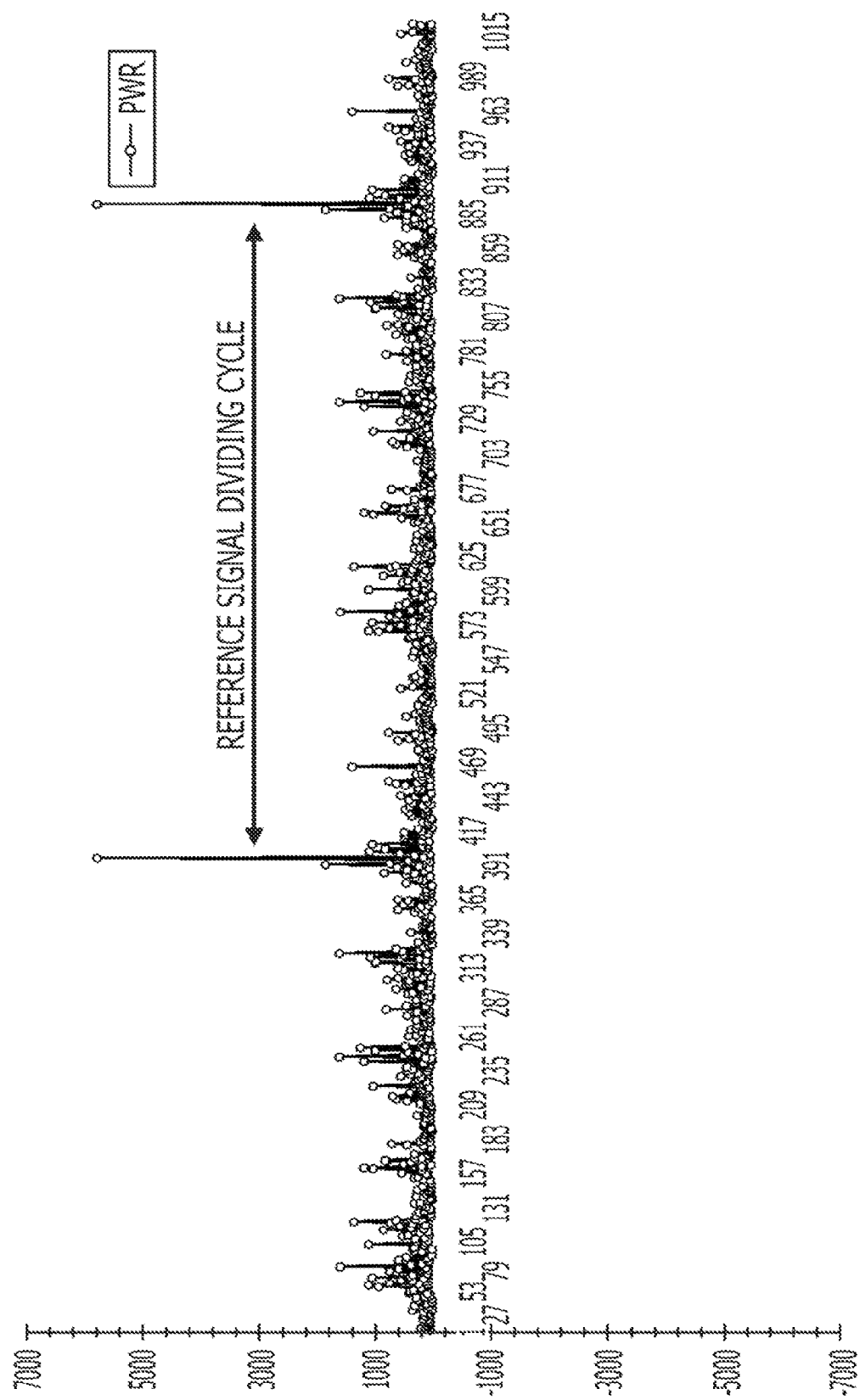
FIG. 9 illustrates an exemplary correlation value.

FIG. 9 illustrates exemplary correlation values. In FIG. 9, the horizontal axis indicates a sampling timing. The vertical axis indicates a power value of a correlation voltage. The power value may be the power value of the correlation value between, for example, the OFDM one-symbol known pattern signal and the reference pattern signal. The correlation value corresponds to one symbol, so that the power value reaches a peak value at every 512-th sampling timing along the horizontal axis. For example, when the power values are plotted with respect to each partial signal included in one symbol, the number of sampling points may be reduced and the peak of the power value may become lower than that illustrated in FIG. 9.

The configurations of the second correlator 320B, the third correlator 320C and the fourth correlator 320D, which are illustrated in FIG. 8, may be substantially the same as or similar to that of the first correlator 320A. Reference signals Rf_B*, Rf_C*, and Rf_D* are respectively input into the respective correlators and each correlation value CR and each correlation peak voltage CRp between each of the reference signals and the receive signal Rx are generated. The second correlator 320B, the third correlator 320C and the fourth correlator 320D respectively output phase information dB, dC and dD of the second partial signal, the third partial signal and the fourth partial signal.

The phase information dA to dD included in the correlation peal voltage values may not correspond to absolute phase components of respective partial signals and may correspond to phase components corresponding to phase differences between respective partial signals. The phase difference between the partial signals is obtained using the above formula (1) based on the correlation peak voltage.

The phase rotation amount detection and verification circuit 340 illustrated in FIG. 8 includes a phase difference calculation section 341-1 and an angle generation section 342-1, a phase difference calculation section 341-2 and an angle generation section 342-2, and a phase difference calculation section 341-3 and an angle generation section 342-3. The phase difference calculation section 341-1 calculates a complex signal having a phase rotation amount (a phase difference) dAB between the first partial signal and the second partial signal based on the first correlation peak voltage dA and the second correlation peak voltage dB using the formula (1). The angle generation section 342-2 obtains an arc tangent of the complex signal to output the phase difference dAB. The phase difference calculation section 341-2 obtains a complex signal having a phase rotation amount (a phase difference) dBC between the second partial signal and the third partial signal based on the second correlation peak voltage dB and the third correlation peak voltage dC. The angle generation section 342-2 outputs the phase difference dBC. The phase difference calculation section 341-3 obtains a complex signal having a phase rotation amount (a phase difference) dCD between the third partial signal and the fourth partial signal based on the third correlation peak voltage dC and the fourth correlation peak voltage dD. The angle generation section 342-3 outputs the phase difference dCD.

The phase graph illustrated on the lower right part of FIG. 8 indicates complex vectors of the correlation peak voltages dA to dD corresponding to the respective partial signals. Angles, for example, phase differences between respective complex vectors correspond to the phase rotation amounts dAB, dBC and dCD included in the complex signals obtained using the formula (1).

The phase rotation amount detection and verification circuit 340 also includes a mean value calculation section 343 that calculates the mean value dθ of the phase rotation amounts (the phase differences) dAB, dBC and dCD, and a low-pass filter 344 that removes noise. Since the mean value dθ is calculated, a noise included in each correlation peak voltage obtained by each of the correlator 320 may be reduced.

The phase rotation amount detection and verification circuit 340 further includes a multiplier 345, a phase rotation section 346, an adder 347, a power conversion section 348, a threshold value judging section 349 and an output section 350 for outputting the effective mean phase rotation amount dθ in order to verify the reliability of the mean phase rotation amount dθ.

Figure 10A:
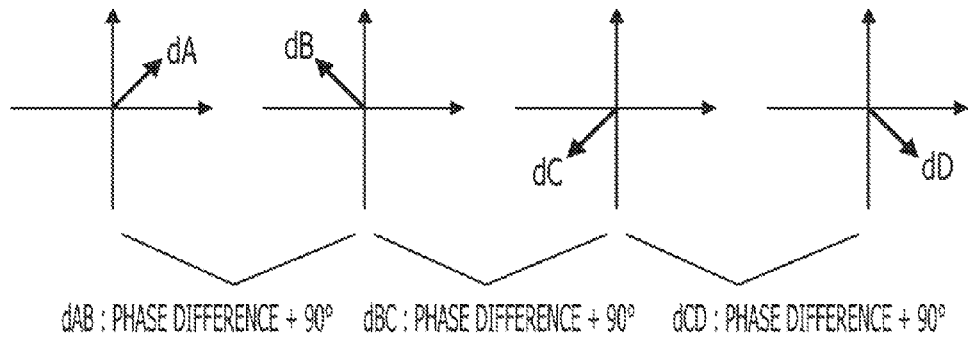
FIGS. 10A to 10C illustrate an exemplary verifying operation.
Figure 10B:
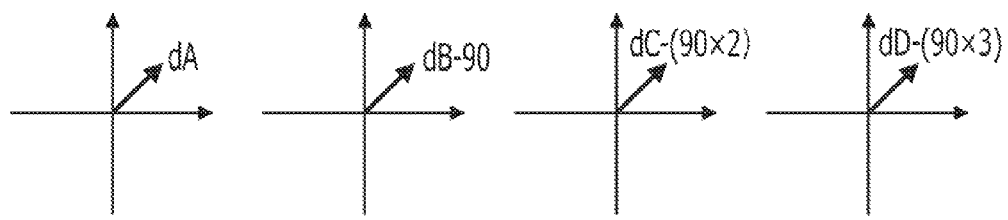
Figure 10C:
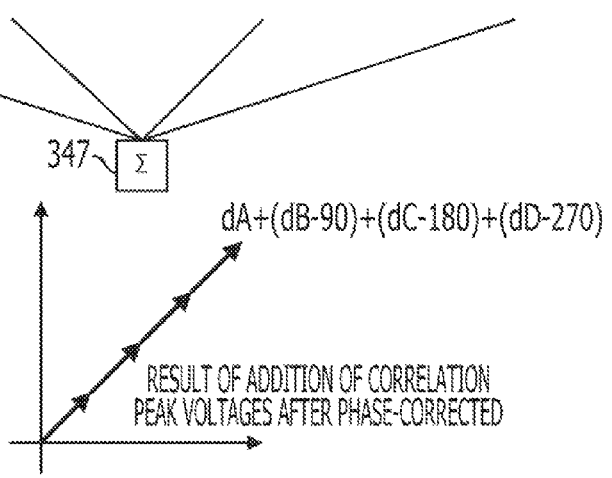

FIG. 10A to FIG. 10C illustrate an exemplary verifying operation. The verifying operation illustrated in FIGS. 10A to 10C may be executed by the phase rotation amount detection and verification circuit 340 illustrated in FIG. 8. The verifying operation may be performed in order of processes illustrated in FIG. 10A, FIG. 10B and FIG. 10C. FIG. 10A illustrates the correlation peak voltages dA to dD obtained by the correlators 320A to 230D of the phase rotation amount detection and verification circuit 340 illustrated in FIG. 8. The phase of each of the correlation peak voltages dA to dD is rotated by 90°. The phase difference calculation section 341 of the phase rotation amount detection and verification circuit 340 calculates complex signals including the phase differences dAB, dBC and dCD based on the adjacent correlation peak voltages. As illustrated in FIG. 10A, the phase difference may be +90°. The mean value calculation section 343 generates the mean phase difference value (the phase rotation amount) dθ.

The multiplier 345 and the phase rotation section 342 rotate the phase of the correlation peak voltage dB dC or dD by −90°, −180°, and −270° to put it in phase with the correlation peak voltage dA. One of the correlation peak voltages dB, dC and dD may be in phase with the correlation peak voltage dA. FIG. 10B illustrates correlation peak voltages dA to dD which are in phase with one another. The correlation peak voltages dA to dD, which have substantially the same phase with one another, are added together by the adder 347. FIG. 10C illustrates an added complex vectors.

The added complex vector illustrated in FIG. 10C is converted to a power by the power conversion section 348. The threshold value judging section 349 verifies whether the power is higher than a threshold value, and when the power is higher than the threshold value, the output circuit 350 latches the mean phase difference value dθ. The mean phase difference value dθ is output to an oscillator control voltage generation circuit 324. The oscillator control voltage generation circuit 324 generates the frequency control voltage Vc of the oscillator such that the mean phase difference value dθ is reduced to a value which is, for example, close to zero and outputs the voltage Vc to the reference clock generation circuit (the voltage control oscillator) VCO.

In FIGS. 10A to 10C, since any error does not occur in the correlation peak voltages dA to dD, the phase difference between the adjacent correlation peak voltages may be +90°. Thus, the complex vector which is added by the adder 347 may have the power which is four times as large as that of each correlation peak voltage. The threshold value of the threshold value judging section 349 may be set to a power which is three to four times as large as that of each correlation peak voltage. When an error occurs in one of the correlation peak voltages and a phase shift is observed, the power of the added complex vector does not reach the value which is four times as large as that of each correlation peak voltage and hence it may be judged that the mean phase difference value dθ is not correct.

The correlation peak value of each of partial signals into which one symbol is divided is detected. Since the phase rotation amount is detected in a short time period, a frequency control may be performed with high accuracy in the high-frequency communication system. For example, as illustrated in FIG. 9, the number of sampling points on the partial signal is 64 which is smaller than 512 which correspond to the number of sampling points on one symbol, so that the correlation peak values obtained by adding the correlation values detected at 64 sampling points on each partial signal may not have a notable peak value. Thus, any accurate correlation peak voltage value may not be detected. The mean phase difference value dθ of phase difference values between each two of the plurality of correlation peak voltages dA to dD is obtained to verify whether an error occurs in one of the correlation peak voltages dA to dD. As a result, the accuracy of the mean phase difference value dθ which is detected based on the correlation peak voltage between partial signals may be increased.

Figure 11:
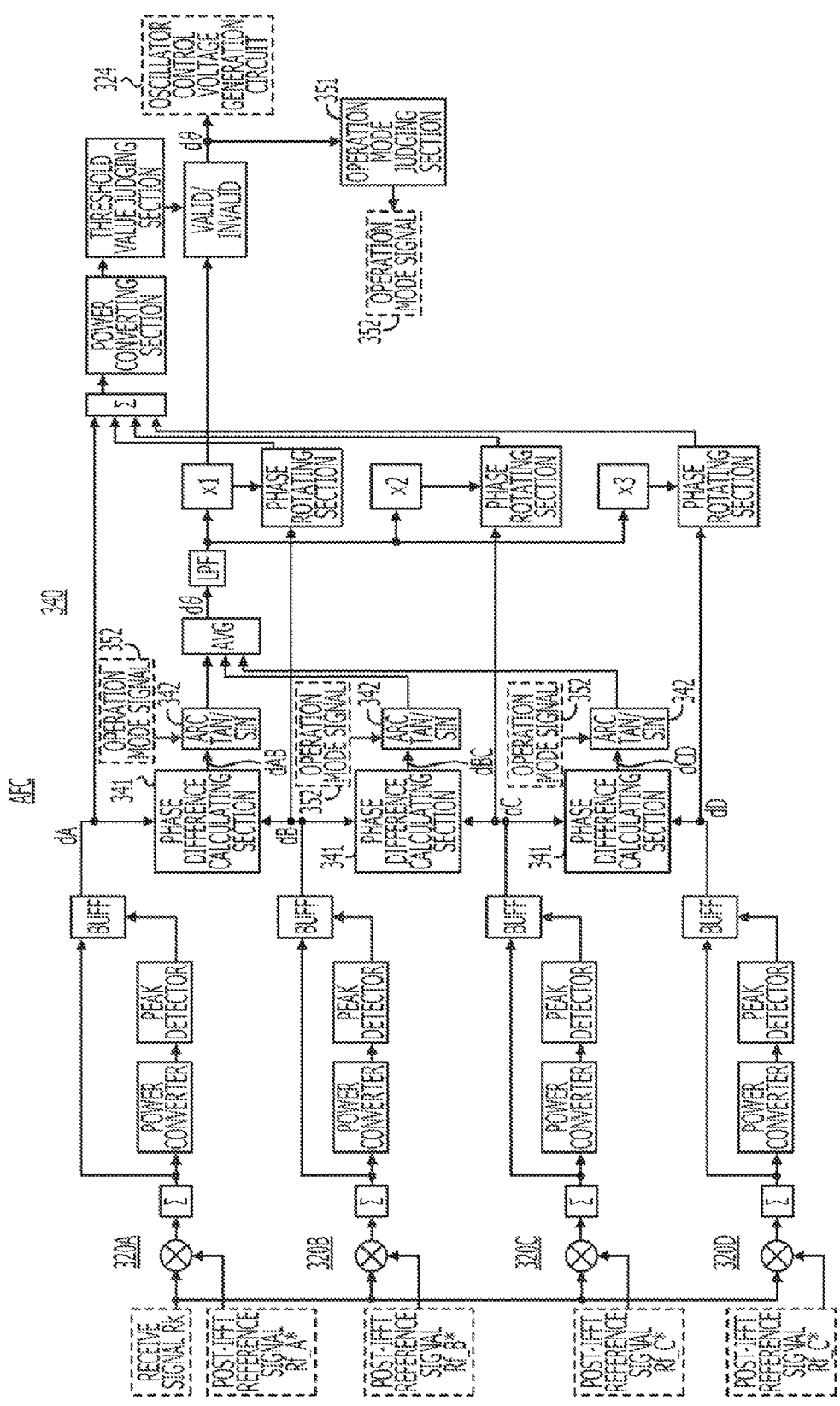
FIG. 11 illustrates an exemplary automatic frequency control circuit.

FIG. 11 illustrates an exemplary automatic frequency control circuit. The automatic frequency control circuit illustrated in FIG. 11 includes an operation mode judgment circuit 351 and an angle generation circuit 342. The angle generation circuit 342 calculates an arc tangent or a sin(sine) based on the complex vector including the phase difference dAB, dBC or dCD which are calculated by the phase difference calculating section 341 to calculate the phase difference. When the phase difference between adjacent or different partial signals is in a range from +180° to −180°, the phase rotation amount may be determined. Which angle the phase difference has in the range from +180° to −180° may be detected by a calculation of the arc tangent of the complex vector including the phase difference dAB, dBC or dCD by the angle generation circuit 342. When the phase rotation amount is in a range from +90° to −90°, the resolution of the angle which is detected on the arc tangent may be reduced. Therefore, which angle the phase difference has in the range from +90° to −90° is detected by a calculation of the sin(Sin) in place of the arc tangent (Arc tan) by the angle generation circuit 342. As a result, the phase rotation amount may be detected with high accuracy. For example, in the calculation of the arc tangent, when the complex vector is x+yi, a reference table in which eight bits are allocated to the x value and eight bits are allocated to the y value may be used. A reference table in which sixteen bits are allocated to the x value may be used in the calculation of the sine.

In FIG. 11, the operation mode judging section 351 monitors signals for the phase difference value dθ. When the mean phase difference value dθ is in a range from +180° to +90° or −90° to −180°, an operation mode signal 352 is set to a first operation mode. When the mean phase difference value dθ is in a range from +90° to −90°, the operation mode signal 32 is set to a second operation mode. When the operation mode signal 352 is in the first operation mode, the angle generation circuit 342 calculates the angle based on the arc tangent and when the operation mode signal 352 is in the second operation mode, the angle generation circuit 342 calculates the angle based on the sine. As a result, the angle of high resolution may be detected with high accuracy.

Figure 12:
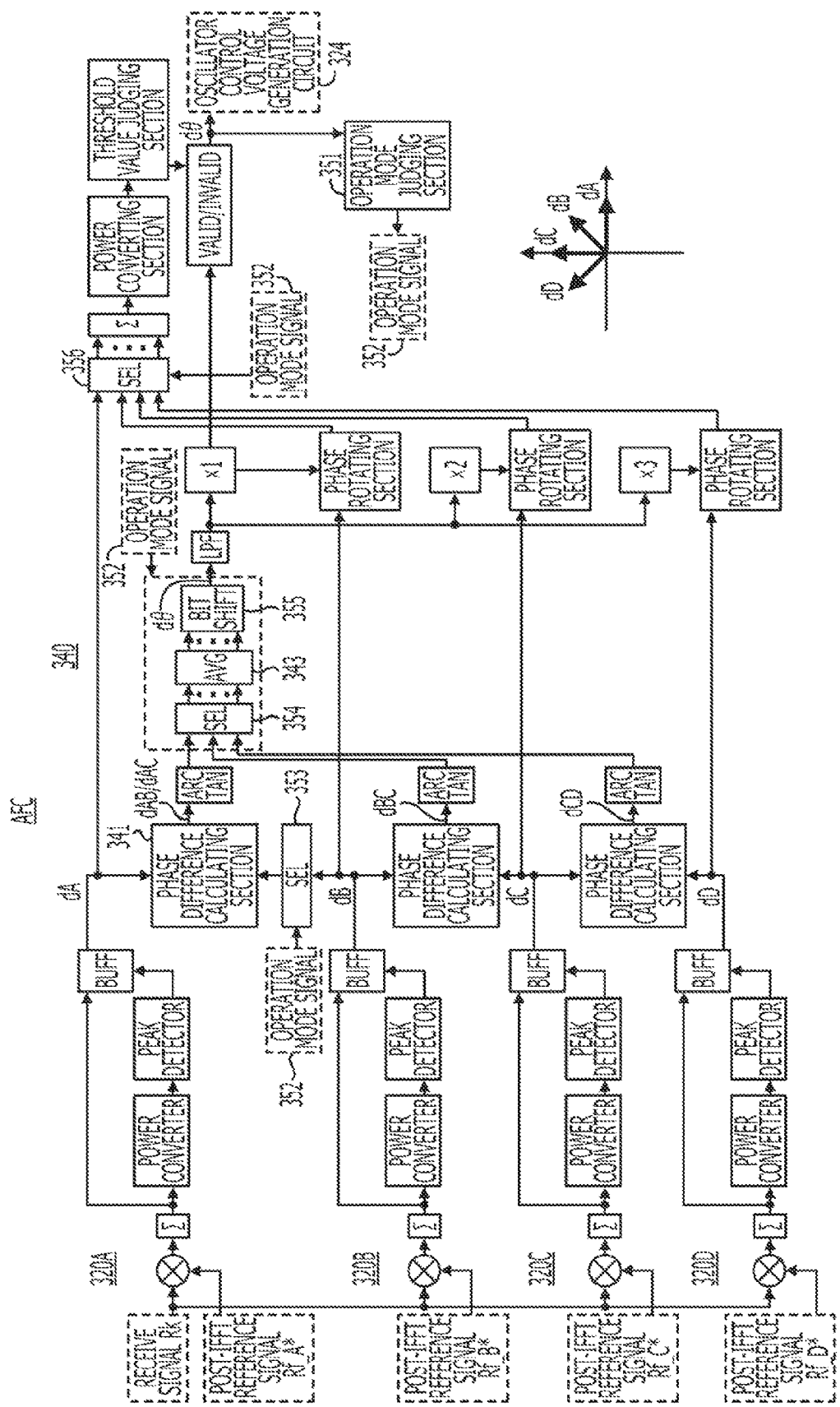
FIG. 12 illustrates an exemplary automatic frequency control circuit.

FIG. 12 illustrates an exemplary automatic frequency control circuit. In high-frequency communication, for example, when a frequency deviation between a source and a sink is increased due to a limitation in accuracy of the voltage control oscillator VCO, the phase rotation amount between signals is detected by setting the phase rotation amounts of a plurality of partial signals in one symbol of the OFDM to a range from +180° to −180°. When the frequency is controlled so as to reduce the phase rotation amount (the mean phase difference) dθ, the frequency deviation is reduced and the phase rotation amount between respective partial signals is also reduced, so that the resolution of the phase rotation amount to be detected may reach a limit. When the resolution is increased by increasing the capacity of an angle table that is referred by the angle calculation section 342, the capacity of a ROM used may be increased.

In FIG. 12, the operation mode judging section 351 monitors signals for the mean phase difference dθ to be detected. At the initial stage of frequency control, the first operation mode is set, and when it is detected that the mean phase difference dθ has been reduced to be within a relatively narrow angular range, the second operation node is set. In the first operation mode, the automatic frequency control circuit AFC detects each of the phase rotation amounts (the phase differences) between adjacent partial signals of four partial signals A, B, C and D to generate the control voltage Vc. In the second operation mode, the circuit AFC detects the phase rotation amount between the partial signals A and C skipping over the partial signal B to generate the control voltage Vc. Even when the resolution of the angle table is reduced and hence the capacity of the table is reduced, the phase rotation amount may be detected with high accuracy by switching the operation mode while the automatic frequency control circuit is operating.

The automatic frequency control circuit illustrated in FIG. 12 includes the operation mode judgment circuit 351 that monitors the mean phase difference dθ to generate the operation mode signal 352, a selector 351 that selects the correlation peak voltage dB or dC in accordance with the operation mode signal, a selector 354 that selects a phase difference, a bit shifter 355 that performs bit shifting and a selector 356. The selector 354 may select either all of the three phase differences dAB, dBC and dCD or the phase difference dAC. The bit shifter 355 may perform one-bit shifting. In FIG. 12, elements other than the above may be substantially the same as or similar to those in FIG. 8.

When an automatic frequency controlling operation is started, the operation mode judgment circuit 351 sets the operation mode signal to the first operation mode. The configuration of the selector or the bit shifter may be substantially the same as or similar to that illustrated in FIG. 8. Each of the phase rotation amounts between respective partial signals of four partial signals A, B, C and D may be detected. When the phase rotation amount is reduced under the control of the control voltage Vc, the operation mode judgment circuit 351 sets the operation mode signal 352 to the second operation mode. The selector 353 selects the correlation peak voltage dC, the phase difference calculating section 341 calculates the complex vector including the phase difference dAC, and the selector 354 selects the phase difference dAC. Since the detected angle dAC is two times as wide as, for example, the angle dAB, the bit shifter 355 shifts the vector by one bit to reduce the angle dAC to a half. The selector 356 may select either the correlation peak voltages dA and dC or all of the four correlation peak voltages dA to dD as like in the first operation mode. When the four correlation peak voltages are added together, the accuracy in verification may be increased.

In FIG. 12, in a third operation mode, the phase difference calculation section 341 may calculate a complex vector including a phase difference dAE. The phase difference dAE may correspond to the phase difference obtained in a ½ cycle of one symbol. In a fourth operation mode, a phase difference may be obtained in the cycle of one symbol.

In the baseband signal processing device, the phase rotation amount between the first partial signal and the second partial signal which are obtained by dividing the known pattern receive signal is detected, so that the phase rotation amount corresponding to the frequency deviation is detected.

In the OFDM communication system, the baseband signal processing device detects the phase rotation amount between the first partial signal and the second partial signal which are obtained by dividing the existing pattern receive signal of one symbol, so that the frequency deviation in the high-frequency OFDM communication system is detected and the deviation may be automatically reduced.

The correlation peak voltage is obtained based on the added value of the correlation voltage values among the plurality of sub-carrier signals included in each partial signal. Therefore, even when a phase rotation amount between sub-carrier signals corresponding to some frequencies is different from other amounts, the phase rotation amount may be detected in a noise-absorbed state.

The baseband signal processing device may be applied to communication systems other than the OFDM communication system. When the baseband signal processing device is applied to the OFDM communication system, the phase rotation amount may be detected in a cycle shorter than the cycle of one symbol.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

The invention claimed is:

1. A signal processing device comprising:
   a first correlator that sequentially multiplies a first receive signal including a pattern in a receive signal and a first reference pattern signal including a complex conjugate of a first partial signal of the first receive signal at a first sampling timing to generate a first correlation voltage;
   a second correlator that sequentially multiplies the first receive signal and a second reference pattern signal including a complex conjugate of a second partial signal, which is behind the first partial signal, at a second sampling timing to generate a second correlation voltage; and
   a phase difference generation circuit that generates a first phase difference between the first partial signal and the second partial signal based on a first correlation peak voltage obtained when the first correlation voltage has a first peak value and a second correlation peak voltage obtained when the second correlation voltage has a second peak value.

2. The signal processing device according to claim 1, wherein
   the receive signal includes a OFDM-modulated signal,
   the first receive signal includes a one-symbol length, and
   the first partial signal includes a group of first sub-carrier signals of the OFDM-modulated signal, and the second partial signal includes a group of second sub-carrier signals of the OFDM-modulated signal.

3. The signal processing device according to claim 1, further comprising:
   a frequency control circuit that controls a local frequency to convert the receive signal to a baseband receive signal based on the first phase difference.

4. The signal processing device according to claim 3, wherein
the frequency control circuit controls the local frequency so as to reduce the first phase difference.

5. The signal processing device according to claim 1, further comprising:
a third correlator that multiplies the first receive signal and a third reference pattern signal including a complex conjugate of a third partial signal, which is behind the first partial signal and the second partial signal, at a third sampling timing to generate a third correlation voltage,
wherein the phase difference generation circuit generates a phase difference between the second partial signal and the third partial signal based on the second correlation peak voltage and a third correlation peak voltage obtained when the third correlation voltage has a third peak value, and includes a phase difference verification circuit that obtains a mean value of the first phase difference and a second phase difference between the second partial signal and the third partial signal.

6. The signal processing device according to claim 5, wherein
the phase difference verification circuit matches phases of the first correlation peak voltage, the second correlation peak voltage and the third correlation peak voltage with one another based on the mean value, adds the first correlation peak voltage, the second correlation peak voltage and the third correlation peak voltage together, and validates the mean value when the power of an added correlation peak voltage is higher than a threshold value.

7. The signal processing device according to claim 1, wherein
the phase difference generation circuit includes a phase difference calculation circuit that calculates the first correlation peak voltage and the second correlation peak voltage to obtain a phase difference signal corresponding to the first phase difference, and an angle generation circuit that extracts an angular component from the phase difference signal, and
the angle generation circuit obtains an arc tangent value of the phase difference signal when the phase difference is in a first phase difference range, and obtains a sine value of the phase difference signal when the phase difference is in a second phase difference range.

8. The signal processing device according to claim 7, wherein
the second phase difference range is narrower than the first phase difference range.

9. The signal processing device according to claim 4, further comprising:
a third correlator that multiplies the first receive signal and a third reference pattern signal including a complex conjugate of a third partial voltage, which is behind the first partial signal and the second partial signal, at a third sampling timing to generate a third correlation voltage,
wherein the phase difference generation circuit generates a phase difference between the first partial signal and the second partial signal, and generates a phase difference between the first partial signal and the third partial signal after the phase difference between the first partial signal and the second partial signal reaches a value less than a certain value.

10. A receiving device comprising:
a frequency conversion circuit that converts a receive signal to a baseband signal based on a local frequency; and
a baseband signal process circuit that processes the baseband signal, the baseband signal processing circuit including:
a first correlator that sequentially multiplies a first receive signal including a pattern in a receive signal and a first reference pattern signal including a complex conjugate of a first partial signal of the first receive signal at a first sampling timing to generate a first correlation voltage;
a second correlator that sequentially multiplies the first receive signal and a second reference pattern signal including a complex conjugate of a second partial signal, which is behind the first partial signal, at a second sampling timing to generate a second correlation voltage; and
a phase difference generation circuit that generates a first phase difference between the first partial signal and the second partial signal based on a first correlation peak voltage obtained when the first correlation voltage has a first peak value and a second correlation peak voltage obtained when the second correlation voltage has a second peak value.

11. The receiving device according to claim 10, wherein
the receive signal includes a OFDM-modulated signal,
the first receive signal includes a one-symbol length, and
the first partial signal includes a group of first sub-carrier signals of the OFDM-modulated signal, and the second partial signal includes a group of second sub-carrier signals of the OFDM-modulated signal.

12. The receiving device according to claim 10, further comprising:
a frequency control circuit that controls a local frequency to convert the receive signal to a baseband receive signal based on the first phase difference.

13. A signal processing method comprising:
multiplying a first receive signal including a pattern in a receive signal and a first reference pattern signal including a complex conjugate of a first partial signal of the first receive signal at a first sampling timing to generate a first correlation voltage;
multiplying the first receive signal and a second reference pattern signal including a complex conjugate of a second partial signal, which is behind the first partial signal of the first receive signal at a second sampling timing to generate a second correlation voltage; and
generating a phase difference between the first partial signal and the second partial signal based on a first correlation peak voltage obtained when the first correlation voltage has a first peak value and a second correlation peak voltage obtained when the second correlation voltage has a second peak value.

14. The signal processing method according to claim 13, wherein
the receive signal includes a OFDM-modulated signal,
the first receive signal includes a one-symbol length, and
the first partial signal includes a group of first sub-carrier signals of the OFDM-modulated signal, and the second partial signal includes a group of second sub-carrier signals of the OFDM-modulated signal.

15. The signal processing method according to claim 13, further comprising:
controlling the local frequency to convert the receive signal to a baseband receive signal based on the phase difference.

* * * * *